United States Patent [19]

Brown

[11] Patent Number: 4,735,300

[45] Date of Patent: Apr. 5, 1988

[54] FLUID COUPLING DEVICE, BIMETAL COIL AND CLIP ASSEMBLY THEREOF

[75] Inventor: Richard J. Brown, Marshall, Mich.

[73] Assignee: Eaton Corporation, Cleveland, Ohio

[21] Appl. No.: 902,013

[22] Filed: Aug. 28, 1986

Related U.S. Application Data

[63] Continuation of Ser. No. 390,429, Jun. 21, 1982, abandoned.

[51] Int. Cl.[4] .................. F16D 35/00; F16D 43/25; B21D 39/00
[52] U.S. Cl. .................. 192/58 B; 29/509; 29/520; 192/82 T; 403/274
[58] Field of Search .............. 192/58 B, 82 T; 29/509, 29/520; 219/93; 403/274

[56] References Cited

U.S. PATENT DOCUMENTS

| | | | |
|---|---|---|---|
| 515,954 | 3/1894 | Druen | 29/509 |
| 665,003 | 1/1901 | Haigh | 403/274 X |
| 930,241 | 8/1909 | Sibert | 29/509 |
| 1,296,402 | 3/1919 | Kahn | 29/509 |
| 3,487,669 | 1/1970 | Kemp | 29/509 X |
| 3,552,532 | 1/1971 | Thomas et al. | 192/58 B |
| 3,581,048 | 5/1971 | Leonardo | 219/93 |
| 3,739,458 | 6/1973 | Reedy et al. | 29/509 X |
| 4,045,653 | 8/1977 | Soper et al. | 29/509 X |
| 4,054,193 | 10/1977 | Streeter | 192/58 R X |
| 4,061,218 | 12/1977 | Tinholt | 192/58 B |
| 4,103,765 | 8/1978 | Tinholt | 192/58 B |
| 4,125,936 | 11/1978 | Rozmus | 29/509 X |
| 4,168,795 | 9/1979 | Bennett | 219/93 X |
| 4,185,726 | 1/1980 | Rohrer | 192/58 B |
| 4,190,140 | 2/1980 | Konkle et al. | 192/58 B X |
| 4,265,348 | 5/1981 | Clarke | 192/58 B |
| 4,278,160 | 7/1981 | Hayashi | 192/58 B X |
| 4,310,085 | 1/1982 | Laflame | 192/58 B |

OTHER PUBLICATIONS

TIG Welding Figures, dated 6/8/82.
"Radial and Orbital Riveting—What They Can Do For You", *Assembly Engineering*, Mar., 1981, pp. 28-34, Terrence Thompson.

*Primary Examiner*—Rodney H. Bonck
*Attorney, Agent, or Firm*—D. A. Rowe; L. J. Kasper

[57] ABSTRACT

A fluid coupling device is disclosed of the type including a valve member (41) actuated by a valve shaft (39) extending through a cover (35), the position of the valve and valve shaft being controlled by a temperature responsive bimetal coil (43). The coil has a first end (47) attached to the valve shaft and a second end attached by means of a clip (53) to the cover. The valve shaft includes a pair of axially extending nubs (61) which are axially deformed into intimate engagement with the first end of the coil to prevent movement of the first end of the coil relative to the valve shaft. The second end of the coil includes a portion (55) parallel to the cover and a portion (57) parallel to the end of the coil. Each of the clip portions includes a projection (59), and the second end of the coil is projection resistance welded to the clip portion (57), and the clip portion (55) is projection resistance welded to the cover. This arrangment results in a simpler, more secure attachment of the coil to the valve shaft and to the cover, while reducing hysteresis of the coupling device.

6 Claims, 2 Drawing Sheets

FLUID COUPLING DEVICE, BIMETAL COIL AND CLIP ASSEMBLY THEREOF

BACKGROUND OF THE DISCLOSURE

This application is a continuation of U.S. application Ser. No. 390,429 filed June 21, 1982, now abandoned.

The present invention relates to fluid coupling devices of the type including temperature responsive bimetal elements, and more particularly, to an arrangement for mounting the ends of the element, and the associated method of assembly.

Fluid coupling devices of the type to which the present invention relates are now well-known in the art and may be better understood by reference to U.S. Pat. No. 3,055,473, assigned to the assignee of the present invention. Although the present invention may be useful with many types and configurations of temperature responsive fluid couplings, it is especially advantageous on those to be used with vehicle radiator cooling fans, and will be described in connection therewith.

A typical fluid coupling device includes an output coupling member and a cover member cooperating to define a fluid chamber. The device includes a valve plate disposed to separate the fluid chamber into a reservoir chamber and an operating chamber. An input coupling member is rotatably disposed within the operating chamber and the device includes valve means operable to control the flow of fluid between the reservoir and the operating chamber. The valve means includes a valve shaft extending outwarly through the cover means and being rotatable relative thereto. The rotational position of the valve shaft and the valve is controlled by a temperature responsive bimetal element having a first end portion connected to the valve shaft and a second end portion fixed relative to the cover means.

A problem which has arisen in connection with the use of viscous fluid couplings on four-cylinder engines relates to the greater vibration inherent in four-cylinder engines. The engine vibration is transmitted to the fluid coupling and typically, one result is excessive wear between the bimetal element and the shaft and between the bimetal element and its mounting bracket. If excessive wear occurs at either of these locations, there may be a substantial change in the temperature at which the coupling engages and/or disengages, causing unsatisfactory operation of the device.

If the wear becomes really excessive, especially between the bimetal coil and the shaft, the coil may become completely detached from the device, with the result that the device will no longer be temperature responsive, but will remain either engaged or disengaged, whichever was the condition of the device at the time that the coil became detached. Typically, the valve shaft is slotted, with the first end portion of the bimetal element being received in the slot, and a pair of nubs on the end of the shaft being crimped together to prevent the end of the bimetal from disengaging from the shaft slot. However, if the slot is oversized, relative to the first end portion of the bimetal, there will be an undesirable loose fit between the bimetal and shaft, even after the crimping operation.

On a typical fluid coupling device sold commerically by the assignee of the present invention, the nubs on the end of the valve shaft add about 0.100 inches to the overall length of the device, and in many of the typical installations for such devices, especially in four-cylinder engines, it is extremely worthwhile to be able to eliminate or substantially reduce even such small amounts of axial length.

It was found that any of the obvious methods of rigidly mounting the free end of the coil would adversely affect the performance of the device by including high hysteresis. Hysteresis will be described in greater detail subsequently, but briefly, it occurs when improper location or alignment of the coil, shaft, or valve results in frictional drag on the shaft or valve. This drag causes the device to remain engaged until the temperature is substantially below the engagement temperature, wasting engine horsepower and resulting in excessive noise of operation.

Among the previously attempted methods of rigidly mounting the free end of the coil is Tungsten Inert Gas (T.I.G.) welding in which a mass of molten filler rod material surrounds the end of the coil. T.I.G. welding has been found generally satisfactory as far as producing a secure attachment of the coil to the cover. However, the relatively large amount of molten material being in contact with the coil causes thermal stresses and hysteresis, and can damage certain parts, such as the valve shaft O ring. In addition, the labor and material (filler rod, inert gas, etc.) cost of T.I.G. welding are relatively high.

SUMMARY OF THE INVENTION

Accordingly, it is an object of the present invention to provide a coupling device of the type described in which the bimetal element is mounted to the valve shaft and to the cover more securely, without causing damage to any parts of the device, or inducing thermal stresses or hysteresis.

It is a related object of the present invention to provide a simple, inexpensive mounting arrangement which achieves the above-stated objects.

The above and other objects of the invention are accomplished by the provision of an improved mounting arrangement of the bimetal element. In accordance with one aspect of the invention, the valve shaft outer end includes a portion extending axially beyond the first end portion of the bimetal element, the extending portion being deformed axially in a direction toward the cover means, into intimate contact with the first end portion of the bimetal element, to substantially prevent both axial and radial movement of the first end of the bimetal element, relative to the valve shaft. In accordance with another aspect of the present invention, the arrangement includes a clip member having a first portion oriented generally parallel to the adjacent surface of the cover means, and a second portion oriented generally parallel to the second end portion of the bimetal element. Either the first portion of the clip member or the cover means defines a first projection, and either the second portion of the clip member or the second end portion of the bimetal defines a second projection. The clip member is projection resistance welded to the cover means and to the second end portion of the bimetal element by means of the first and second projections, respectively.

DESCRIPTION OF THE PREFERRED EMBODIMENT

Figure 1:
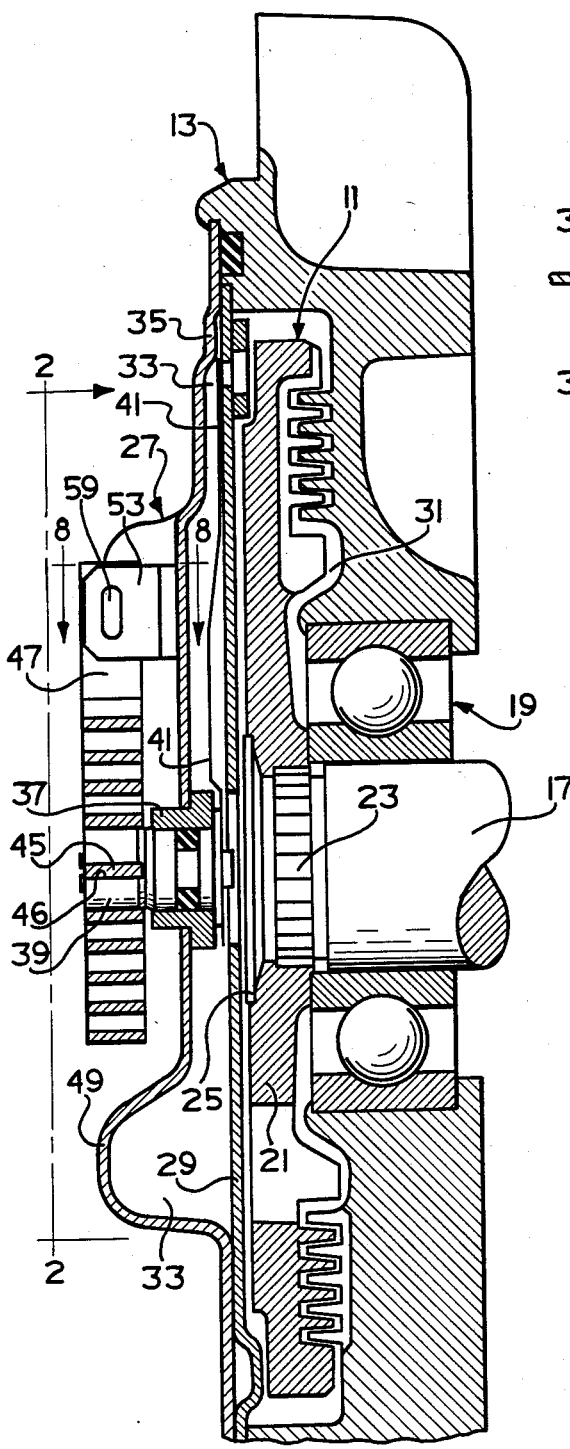
FIG. 1 is an axial cross section of a typical fluid coupling device of the type with which the present invention may be utilized.

Referring now to the drawings, which are not intended to limit the invention, FIG. 1 illustrates a preferred form of a fluid coupling device with which the present invention may be utilized. The fluid coupling device includes an input coupling member 11 and an output coupling member 13. The fluid coupling of the subject embodiment may be used as a drive for an automotive engine accessory, and specifically, as a drive for a radiator cooling fan. The fan (not shown) may be bolted to the output coupling member 13 by means of a plurality of threaded bores (not shown in FIG. 1) formed in the member 13. It will be understood, however, that the use of the present invention is not limited to any particular fluid coupling configuration or application.

The fluid coupling includes an input shaft 17 on which input member 11 is mounted and which is rotatably driven, typically by means of a flange (not shown) which may be bolted to the flange of the water pump (not shown). The input shaft 17 functions as a support for the inner race of a bearing set 19, which is seated on the inside diameter of the output coupling member 13.

The input coupling member 11 is in the form of a disc having a hub portion 21 supported by the forward end of the shaft 17. The hub portion 21 has an opening therethrough which has an interference fit with a serrated portion 23 of the shaft 17. The hub portion 21 is pressed onto the serrated portion 23 until it abuts the side of the inner race of the bearing set 19, and the output end (left end in FIG. 1) of the shaft 17 has a retaining portion 25, to positively retain the input coupling member 11 on the shaft 17, such that rotation of the shaft 17 causes rotation of the input coupling member 11.

The output coupling member 13 cooperates with a cover assembly, generally designated 27, to define a fluid chamber therebetween, the fluid chamber being separated by a valve plate 29 into a fluid operating chamber 31 and a fluid reservoir chamber 33.

Included within the cover assembly 27 is a stamped cover member 35 defining a central aperture which receives a generally cylindrical insert member 37. Rotatably disposed within the insert member 37, and supported thereby, is a valve shaft 39, extending "outwardly" (to the left in FIG. 1) through the cover member 35. Attached to the inner end (right end in FIG. 1) of the valve shaft 39 is a valve arm 41, the general construction and operation of which may be better understood by reference to U.S. Pat. No. 3,055,473.

Figure 2:
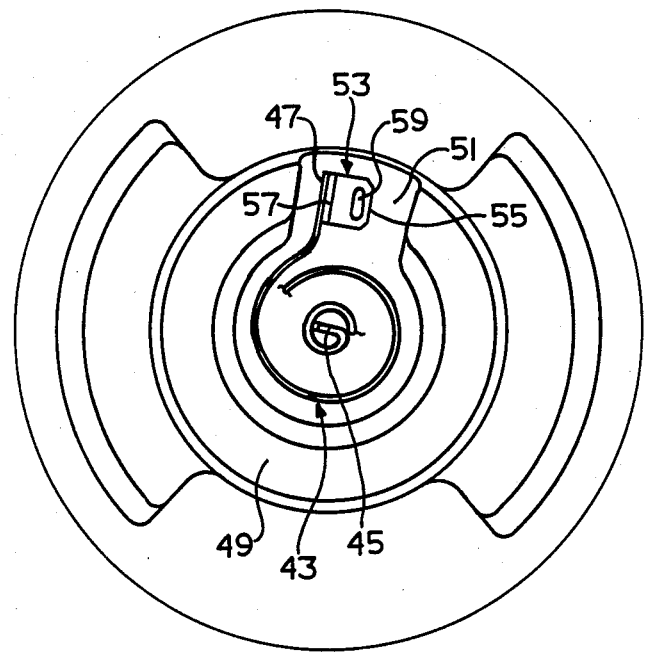
FIG. 2 is a fragmentary plan view taken on line 2—2 of FIG. 1.

Referring now to FIG. 2, in conjunction with FIG. 1, it may be seen that the cover assembly 27 includes a bimetal element, generally designated 43 which, in the subject embodiment, is formed in the shape of a helical coil and is shown broken-away in FIG. 2. The bimetal coil 43 includes a first end portion 45, received within a slot 46 formed in the outer end of the valve shaft 39. The bimetal coil 43 also includes a second end portion, generally designated 47. The cover member 35 includes a raised, generally annular reservoir portion 49, and a flat surface portion 51 oriented generally perpendicular to the axis of rotation of the fluid coupling device. The raised reservoir portion 49 has a circumferential extent which is almost a full circle, with the exception of the "valley" in which the second end portion 47 of the bimetal coil 43 is located. It should become apparent, upon a reading of the remainder of the specification, that the configuration of the cover member 35 does not form an essential part of the present invention.

It is a feature of the present invention that the cover assembly 27 includes a clip member, generally designated 53, the function of which is to maintain the second end portion 47 of the bimetal coil 43 substantially fixed relative to the cover member 35. As used herein, the term "substantially fixed" should be understood to mean that the second end portion 47 is held sufficiently rigidly to prevent the type of destructive wear and movement discussed previously in connection with the prior art.

FIGS. 3–5

Figure 3:
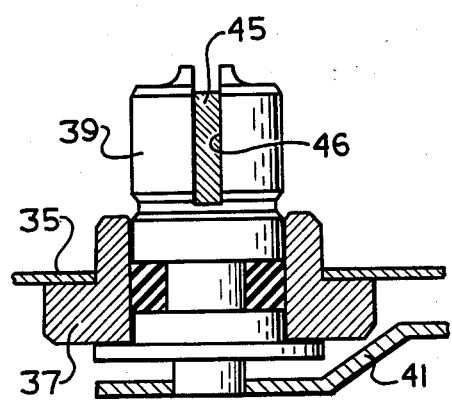
FIG. 3 is an enlarged, fragmentary view similar to FIG. 1, illustrating the valve shaft portion of the device prior to final assembly.
Figure 4:
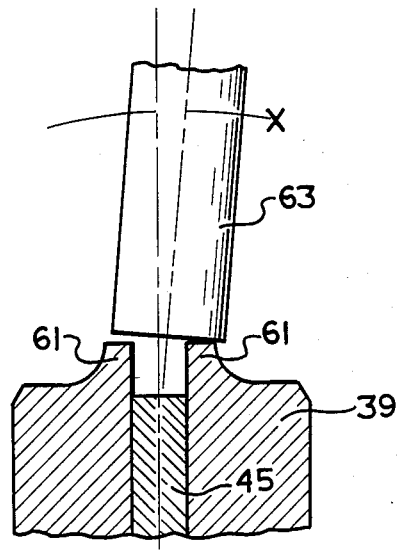
FIG. 4 is a view similar to FIG. 3 illustrating somewhat schematically the axial deformation of the valve shaft in accordance with the invention.
Figure 5:
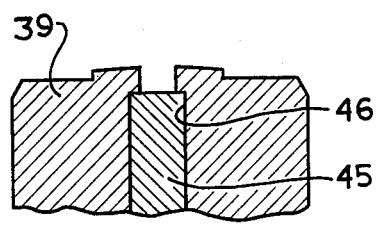
FIG. 5 is a further enlarged view of the end of the valve shaft after deformation.

Referring now primarily to FIGS. 3–5, there will now be described the arrangement and method for attaching the first end portion 45 of the coil 43 to the valve shaft 39. In FIG. 3, the first end portion 45 of the coil 43 is shown positioned in the slot 46, in preparation for assembly of the coil to the shaft. As may be seen in the further enlarged view of FIG. 4, the end of the valve shaft 39 includes a pair of nubs 61 which extend axially beyond the first end portion 45.

In assembling the coil and shaft, it is a feature of the present invention to utilize some sort of tool 63, shown only schematically in FIG. 4, the function of which is to axially deform the nubs 61 in a direction toward the cover 35, and into intimate contact with the first end portion 45. Such cold working of the nubs 61 into contact with the first end portion 45 results in a substantially improved gripping of the end portion 45, and prevents movement of the end portion 45 relative to the valve shaft 39.

Preferably, the axis of the tool 63, as shown in FIG. 4, is oriented at an acute angle X relative to the axis of the shaft 39. In the subject embodiment, the angle X is about 5 degrees which is generally sufficient to cold flow the nubs 61 into the slot 46, over the end portion 45 to the position shown in FIG. 5.

Preferably, such axial deformation of the nubs 61 may be accomplished by a process such as radial riveting, a process in which the tool 63 if fixtured such that it moves in a rosette pattern, progressively deforming the nubs 61 from all directions around the "circumference" generally defined by the nubs 61.

Among the advantages of the arrangement illustrated in FIGS. 3–5 is the reduction in the axial length of the crimped-together nubs used in the prior art to retain the coil end portion within the shaft slot. This axial length reduction provides the option of reducing the overall axial length of the unit, or of increasing the axial length of some other element of the device. In the subject embodiment, the axial length of the insert member 37 has been increased, as has been the axial length of the mating portion of the valve shaft 39. This results in an increase in the bearing area between the member 37 and shaft 39, thus improving durability of the device and reducing the hysteresis which can be caused by insufficient bearing area. In the subject embodiment, it was possible, as a result of the invention, to increase the bearing area approximately 35 percent.

FIGS. 6–8

Figure 6:
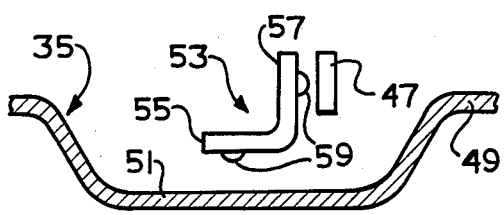
FIGS. 6–8 are enlarged, fragmentary views taken generally on line 8—8 of FIG. 1, illustrating somewhat schematically the projection welding of the clip to the coil and to the cover in accordance with the invention.
Figure 8:
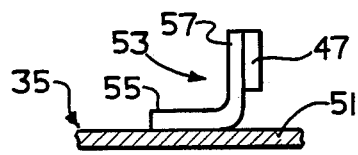
Figure 7:
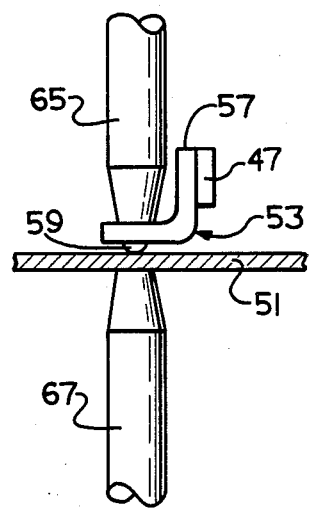

Referring now primarily to FIGS. 6–8, there is illustrated an arrangement and method for securely attaching the second end portion 47 of the bimetal coil 43 to the cover member 35. By viewing FIG. 2, in conjunction with FIGS. 6–8, it may be seen that the clip member 53 comprises a portion 55 oriented generally parallel to the surface portion 51 of the cover 35, and a portion 57 oriented generally parallel to the second end portion 47 of the bimetal 43. Preferably, each of the portions 55 and 57 is substantially identical, such that the clip member 53 is symmetrical and can be oriented with either portion engaging either the cover or second end portion 47.

Each of the portions 55 and 57 includes an elongated projection 59, the function of which is to permit the clip member 53 to be projection resistance welded to the second end portion 47 and to the surface portion 51.

It should be understood by those skilled in the art that FIG. 6 does not represent an actual preassembled position or relationship of the parts shown therein, but is shown only for purpose of illustration. In actual practice, it is preferred that the portion 57 of the clip member 53 be projection welded to the second end portion 47 of the bimetal 43 to form a subassembly comprising the coil 43 and clip member 53. That subassembly is then combined with the cover assembly 27, by first attaching the first end portion 45 to the valve shaft as shown in FIGS. 3–5 and described previously. Next, with the clip member 53 in the position shown in FIG. 7, a pair of resistance welding electrodes 65 and 67 are moved into the position shown in FIG. 7, engaging the portion 55 of the clip member 53 and the underside of the cover member 35, respectively. As is well known to those skilled in the welding art, the projection welding step occurs by means of the application of a voltage across the electrodes 65 and 67, thereby causing a large current (e.g., 6000 amperes) to flow therebetween which momentarily generates sufficient heat along the line of contact between the projection 59 and surface portion 51 to partially melt the projection 59 and surface portion 51, and weld the portion 55 to the cover member 35.

It is preferred that at each step of the welding process, only a single projection be utilized, to eliminate any heat balance problems which could occur if more than one projection were used, due to varying amounts of surface contact resistance occurring between the projections and the adjacent surface.

It is believed to be within the knowledge of those skilled in the art, based upon a reading and understanding of the this specification, to utilize appropriate resistance welding practices and projection geometry. For a given size and configuration of the clip member 53, and size and configuration of the projections 59, and based upon the thickness of the cover member 35 and end portion 47, it is a relatively straightforward process to select the appropriate welding criteria, as set forth by the American Welding Society. Among these criteria are the clamping force between the electrodes 65 and 67, the weld cycle time (in cycles per second) the weld hold time (also in cycles per second), and the weld current (in amperes per projection).

The present invention has been described in detail sufficient to enable one skilled in the art to utilize the invention. It should be understood that within the scope of the invention, many alterations and modifications of the preferred embodiment may be made. It is intended to include all such alterations and modifications as part ot the invention, insofar as they come within the scope of the appended claims, or the range of equivalents thereof.

I claim:

1. A fluid coupling device of the type including a first rotatable member defining an axis of rotation, cover means associated with the first member to define a fluid chamber therebetween, a valve plate disposed to separate the fluid chamber into a fluid operating chamber and a fluid reservoir chamber, a second rotatable member disposed in the fluid operating chamber and rotatable relative to the first member, valve means operable to control fluid communication between the operating chamber and the reservoir chamber and including a valve shaft disposed generally axially and extending outwardly through the cover means and being rotatable relative thereto, a bimetal element having a first end portion operatively connected to the valve shaft and a second end portion, the valve shaft outer end having a slot to receive therein the first end portion of the bimetal element, the first end portion including side surfaces engaging the valve shaft slot and an axial end surface, the valve shaft outer end further including a portion extending axially beyond the axial end surface of the first end portion, said extending portion being deformed, characterized in that:

(a) the axially-extending portion being cold-flowed radially, toward said axis of rotation, and axially in a direction toward said cover means into intimate contact with the axial end surface of the first end portion of the bimetal element substantially to prevent both axial and radial movement of the first end portion of the bimetal element, relative to the valve shaft; and (b) means for securely attaching the second end portion of the bimetal element to the cover means with approximately the same degree of rigidity as the attachment of the valve shaft and the first end portion of the bimetal element.

2. A fluid coupling device as claimed in claim 1 characterized by the bimetal element comprising a helical coil member.

3. A fluid coupling device as claimed in claim 1 characterized by said means for attaching the second end portion comprising welding a clip member to the second end portion and welding said clip member to the cover means.

4. A fluid coupling device as claimed in claim 1 characterized by the valve shaft outer end including a plurality of axially extending portions.

5. A fluid coupling device as claimed in claim 1 characterized by said extending portion being cold-flowed axially by means of radial riveting.

6. A fluid coupling device as claimed in claim 1 characterized by the valve shaft outer end defining a pair of axially-extending portions, said axially-extending portions being disposed on opposite sides of said first end portion of the bimetal element.

* * * * *